US007055320B2

(12) United States Patent
Nagai et al.

(10) Patent No.: US 7,055,320 B2
(45) Date of Patent: Jun. 6, 2006

(54) ACTUATOR

(75) Inventors: Shigekazu Nagai, Adachi-ku (JP); Akio Saitoh, Kawaguchi (JP); Masaru Saitoh, Mitsukaido (JP)

(73) Assignee: SMC Kabushiki Kaisha, Tokyo (JP)

( * ) Notice: Subject to any disclaimer, the term of this patent is extended or adjusted under 35 U.S.C. 154(b) by 19 days.

(21) Appl. No.: 10/902,044

(22) Filed: Jul. 30, 2004

(65) Prior Publication Data

US 2005/0022523 A1 Feb. 3, 2005

(30) Foreign Application Priority Data

Aug. 1, 2003 (JP) ............................ 2003-285360

(51) Int. Cl.
*F16H 39/00* (2006.01)

(52) U.S. Cl. ............................................ 60/476; 92/71

(58) Field of Classification Search .................. 60/473, 60/475, 476; 92/71

See application file for complete search history.

(56) References Cited

U.S. PATENT DOCUMENTS 4,667,472 A * 5/1987 Clay et al. .................... 60/387
4,903,577 A * 2/1990 Loffler ......................... 91/488
5,144,801 A * 9/1992 Scanderbeg et al. .......... 60/475
5,480,161 A 1/1996 Borowski
6,615,705 B1 9/2003 Reinelt et al.
6,799,953 B1 * 10/2004 Nelson ....................... 417/269

FOREIGN PATENT DOCUMENTS

| | | |
|---|---|---|
| EP | 0 547 009 | 6/1993 |
| JP | 5-248412 | 9/1993 |
| JP | 2003-139108 | 5/2003 |

OTHER PUBLICATIONS

Co-pending U.S. Appl. No. 10/968,128, by Shigekazu Nagai et al., filed on Oct. 20, 2004.

* cited by examiner

*Primary Examiner*—Thomas E. Lazo
(74) *Attorney, Agent, or Firm*—Paul A. Guss

(57) ABSTRACT

An actuator comprises a pump-driving section which is driven and rotated by a current, and a pump mechanism which is connected to the pump-driving section and which sucks/discharges a pressure oil. A cylinder mechanism, which has a piston that is displaceable in the axial direction by being supplied with the pressure oil, is provided on the pump-driving section and the pump mechanism. The amount of discharge of the pressure oil to the cylinder mechanism is adjusted by freely changing the angle of inclination of a tilting member provided in the pump mechanism.

28 Claims, 8 Drawing Sheets

ACTUATOR

BACKGROUND OF THE INVENTION

1. Field of the Invention

The present invention relates to an actuator that makes it possible to drive a pump mechanism by using a pump-driving section and operate a displaceable member of a driving mechanism movably back and forth under the action of a pressure fluid supplied from the pump mechanism.

2. Description of the Related Art

An actuator, which is driven by the aid of a pressure fluid (for example, pressure oil), has been hitherto used, for example, in order to transport a workpiece and/or position the workpiece.

For example, a hydraulic actuator, which is disclosed in Japanese Laid-Open Patent Publication No. 2003-139108, comprises, for example, a motor which is driven and rotated by a current, a hydraulic pump which discharges the operation oil under the driving action of the motor, a piston which is displaceable in the axial direction with the aid of the operation oil, and a rod. The hydraulic pump is connected to the hydraulic actuator via pipes. The pipes comprise a first pipe for connecting the hydraulic pump and a port disposed on the side of the head of the hydraulic actuator, and a second pipe for connecting the hydraulic pump and a port disposed on the side of the rod of the hydraulic actuator.

When the motor is driven and operated, the operation oil is supplied from the hydraulic pump via the first pipe or the second pipe to the side of the head or the rod of the hydraulic actuator. The piston and the rod are displaced in the axial direction of the hydraulic actuator under the pressing action of the operation oil supplied into the hydraulic actuator. A pressure-adjusting mechanism, which suppresses the increase in pressure when the operation oil contained in the second pipe expands, is provided at an intermediate position of the second pipe.

It is assumed that the hydraulic actuator as described above is used in a way that depends on the shape of the workpiece and the situation, and is controlled by adjusting the output, such as the displacement speed of the piston and the rod, when the workpiece is moving or being positioned.

However, in the case of the hydraulic actuator, the operation oil is supplied from the hydraulic pump via the first pipe or the second pipe to the head or the rod of the hydraulic actuator. The pressure-adjusting mechanism, which is provided at the intermediate position of the second pipe, only absorbs increases in the operation oil when the pressure in the second pipe increases, as the piston and the rod are displaced.

That is, it is impossible to adjust the flow rate of the operation oil to be supplied from the hydraulic pump to the hydraulic actuator. Therefore, it is difficult to highly accurately adjust the displacement speed when the piston and the rod are displaced. For example, it is impossible to conform to the shape of the workpiece and the situation of the use of the hydraulic actuator when the workpiece is in motion.

Further, the hydraulic actuator and the hydraulic pump for supplying the operation oil are connected via first and second externally disposed pipes. Therefore, it is difficult to connect the first and second pipes. Further, the entire actuator is large in size, and hence requires a large installation space.

SUMMARY OF THE INVENTION

A general object of the present invention is to provide an actuator that makes it possible to adjust the amount of discharge of a pressure fluid to be supplied to a driving mechanism while reducing the size of the actuator by integrally providing a pump mechanism and a driving mechanism.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
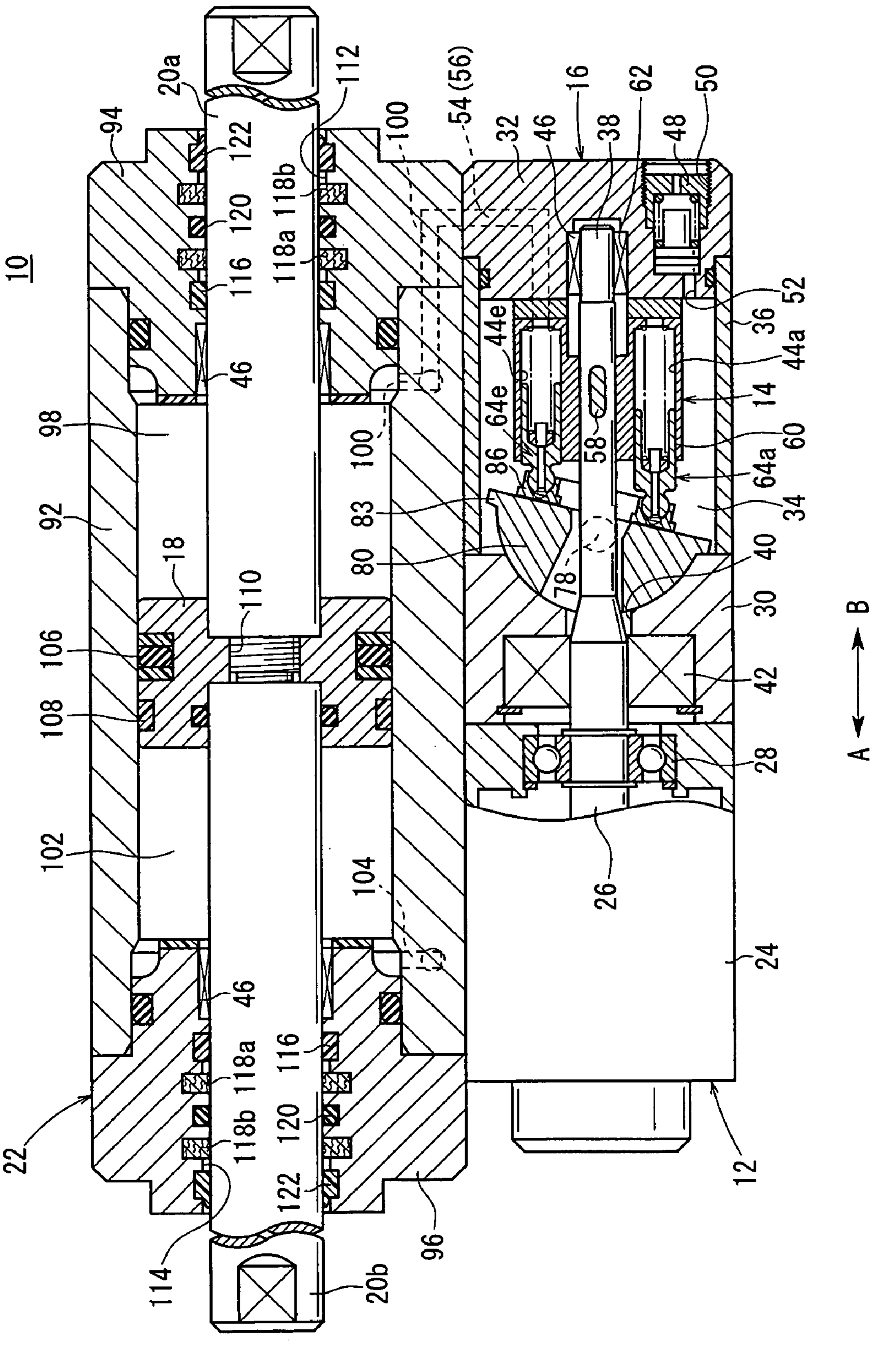
FIG. 1 shows a longitudinal sectional view illustrating an actuator according to a first embodiment of the present invention.

With reference to FIG. 1, reference numeral 10 indicates an actuator according to a first embodiment of the present invention.

The actuator 10 comprises a pump-driving section 12 which is driven and rotated in accordance with a current, and a pump mechanism 16 which is integrally connected to the side of the pump-driving section 12 and which has a sucking/discharging section 14 to be energized/deenergized by the pump-driving section 12. The actuator 10 further comprises a cylinder mechanism (driving mechanism) 22, which is integrally provided on the pump-driving section 12 and the pump mechanism 16 and which has a piston (displaceable member) 18 to cause displacement in the axial direction by being supplied with a pressure oil, and first and second piston rods 20*a*, 20*b*.

The pump-driving section 12 is composed of, for example, an induction motor, a brush motor, or a DC motor. The pump-driving section 12 has a rotary driving source 24 which is driven and rotated by the current supplied from an unillustrated power source. The rotary driving source 24 has a drive shaft 26 that protrudes from the side of the pump mechanism 16. The drive shaft 26 is integrally movable under the rotary action of the rotary driving source 24. The drive shaft 26 is supported rotatably by the aid of a first bearing 28 in the rotary driving source 24.

Figure 2:
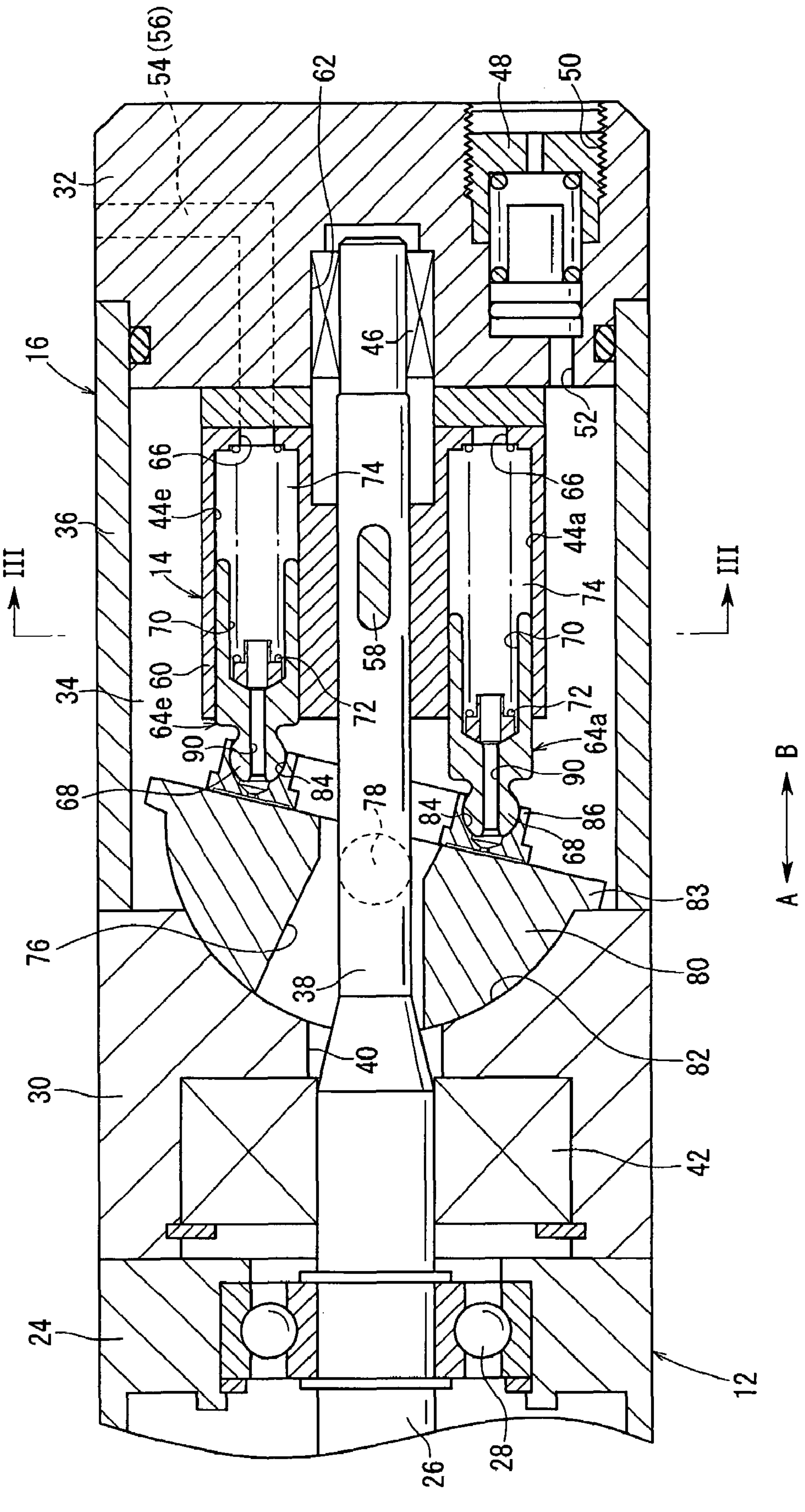
FIG. 2 shows a magnified longitudinal sectional view illustrating a pump mechanism shown in FIG. 1.

As shown in FIG. 2, the pump mechanism 16 comprises a pump body 30, which is integrally connected to a side portion of the pump-driving section 12, and a cylindrical casing (body) 36 which has one end connected to the pump body 30 and which has another end tightly closed by an end plate 32, with a pressure fluid-charging chamber 34 formed therein. The pump mechanism 16 further comprises a rotary shaft 38 that penetrates through the pressure fluid-charging chamber 34 in relation to the pump body 30, and the sucking/discharging section 14 which is rotatable integrally with the rotary shaft 38 under the rotary action of the rotary shaft 38.

A through-hole 40, which penetrates in the axial direction, is formed in the pump body 30. A rotary shaft 38, which is connected integrally and coaxially with the drive shaft 26 of the rotary driving source 24, is inserted into the through-hole 40. One end of the rotary shaft 38 is rotatably supported by a second bearing 42 in the pump body 30. The other end of the rotary shaft 38 is supported by a bush 46, which is installed in a bush hole 62 of the end plate 32.

An installation hole 50, in which a pressure-adjusting plug 48 is installed, is formed in the end plate 32 so that the installation hole 50 is open to the outside. The installation hole 50 communicates with the interior of the pressure oil-charging chamber 34 via a communication hole 52. The pressure-adjusting plug 48 is screw-engaged with the installation hole 50. The pressure of the pressure oil charged into the pressure oil-charging chamber 34 can be freely adjusted under the screwing action of the pressure-adjusting plug 48. An accumulator (not shown), which functions as a retaining mechanism capable of retaining a predetermined amount of the pressure oil, may be connected in place of the pressure-adjusting plug 48.

The pressure-adjusting plug 48 installed in the installation hole 50 may be detached, and the pressure oil can be charged into the pressure oil-charging chamber 34 from an unillustrated pressure oil supply source via the installation hole 50. Further, the pressure oil charged to the pressure oil-charging chamber 34 may be discharged to the outside through the installation hole 50.

First and second fluid passages 54, 56, which communicate with the pressure oil-charging chamber 34 and through which the pressure oil flows, are formed in the end plate 32. As shown in FIG. 1, the first fluid passage 54 extends by a predetermined length in the axial direction from the side of the pressure oil-charging chamber 34 of the end plate 32, and then it extends substantially perpendicularly toward the cylinder mechanism 22.

Similarly, the second fluid passage 56 also extends by a predetermined length in the axial direction from the side of the pressure oil-charging chamber 34 of the end plate 32, and then it extends substantially perpendicularly toward the cylinder mechanism 22. The first fluid passage 54 and the second fluid passage 56 are formed independently while being separated from each other by a predetermined spacing distance in the end plate 32.

As shown in FIG. 1, the first fluid passage 54 communicates with a first cylinder chamber 98 via a first passage 100 formed in a cylinder tube 92 and a first cover member 94 of the cylinder mechanism 22 as described later on. Further, the second fluid passage 56 communicates with a second cylinder chamber 102 via a second passage 104 formed in the cylinder tube 92 of the cylinder mechanism 22 as described later on.

Figure 3:
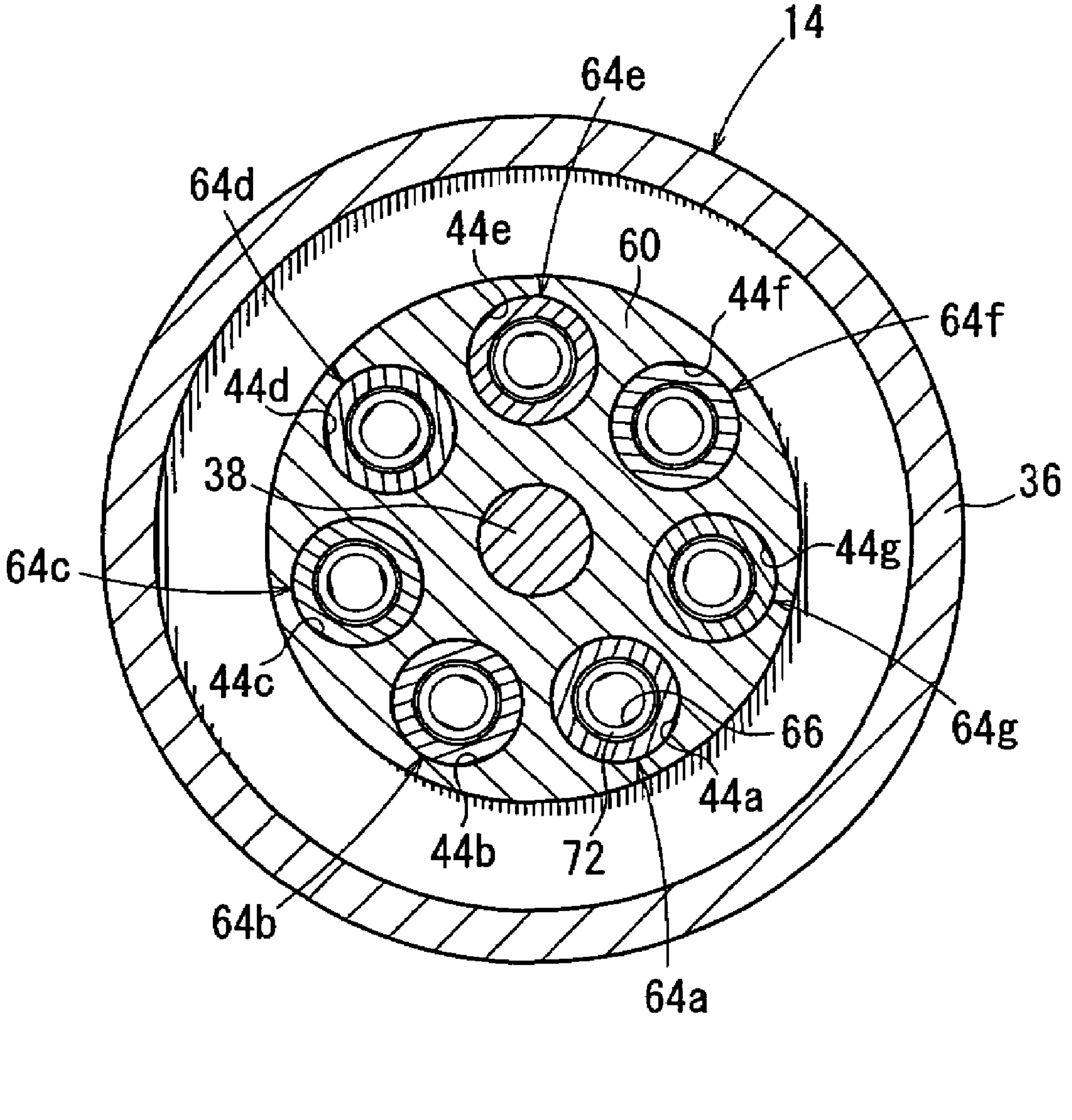
FIG. 3 shows a lateral sectional view illustrating a sucking/discharging section of the pump mechanism shown in FIG. 2.

As shown in FIG. 2, the sucking/discharging section 14 is provided in the pump mechanism 16. The sucking/discharging section 14 is provided with a cylinder block (cylinder body) 60 which is fitted to a central portion of the rotary shaft 38 by the aid of a key member 58 and which is rotatable integrally with the rotary shaft 38. As shown in FIG. 3, the cylinder block 60 is composed of a plurality of (for example, seven) holes 44*a* to 44*g* which are arranged so that they are separated from each other by predetermined angles in the circumferential direction, a plurality of (for example, seven) pump pistons 64*a* to 64*g* which are substantially parallel to the axis of the rotary shaft 38 with an identical structure, which are slidable along the holes 44*a* to 44*g* of the cylinder block 60 respectively, and which correspond to the number of the holes 44*a* to 44*g*, and pressure oil holes 66 (see FIG. 2) which are formed on the side of the end plate 32 of the cylinder block 60 and which communicate with the holes 44*a* to 44*g*. The number of the pump pistons 64*a* to 64*g* is not limited to seven. A plurality of pump pistons 64*a* to 64*g* may be provided corresponding to the number of holes 44*a* to 44*g* arranged for the rotary shaft 38.

As shown in FIG. 2, a spherical section 68 is formed on one end side of each of the pump pistons 64*a* to 64*g*. A recess 70, which has an interior recessed toward the one end, is formed on the opposite side of each of the pump pistons 64*a* to 64*g*. A spring 72 is interposed between the recesses 70 and holes 44*a* to 44*g* of the cylinder block 60. Each of the pump pistons 64*a* to 64*g* is continuously pressed toward the pump-driving section 12 (in the direction of the arrow A) by the resilient force of the spring 72. Respective chambers 74 are formed, which are defined by the holes 44*a* to 44*g* of the cylinder block 60 and the recesses 70 of the pump pistons 64*a* to 64*g*. Each chamber 74 functions as a pressure oil suction chamber and a pressure oil-discharging chamber.

The sucking/discharging section 14 has a tilting member (adjusting member) 80, which is kept out of contact with the rotary shaft 38 by the aid of a through-hole 76, which is connected to an adjusting lever (rotatable member) 88 (see FIG. 4) rotatably supported by the casing 36 by the aid of a connecting shaft 78, and which is tilted by a predetermined angle. The tilting member 80 is formed to have a substantially hemispherical cross section, and it is supported tiltably by the aid of the connecting shaft 78. The tilting member 80 is installed so that it engages with a recess 82 formed to have a substantially hemispherical cross section on the side of the end plate 32 of the pump body 30. An internal stopper 83, which protrudes radially outwardly by a predetermined length, is formed on the outer circumferential surface of the tilting member 80.

When the angle of rotation of the adjusting lever 88 is detected, for example, by using an unillustrated angle-detecting sensor, it is possible to easily confirm the angle of inclination of the tilting member 80 from the outside. Therefore, it is possible to conveniently recognize the output from the cylinder mechanism 22.

A holding section 86, which has an annular groove 84 for engaging with the spherical sections 68 of the plurality of pump pistons 64*a* to 64*g*, is formed on the side of the end plate 32 of the tilting member 80.

Figure 4:
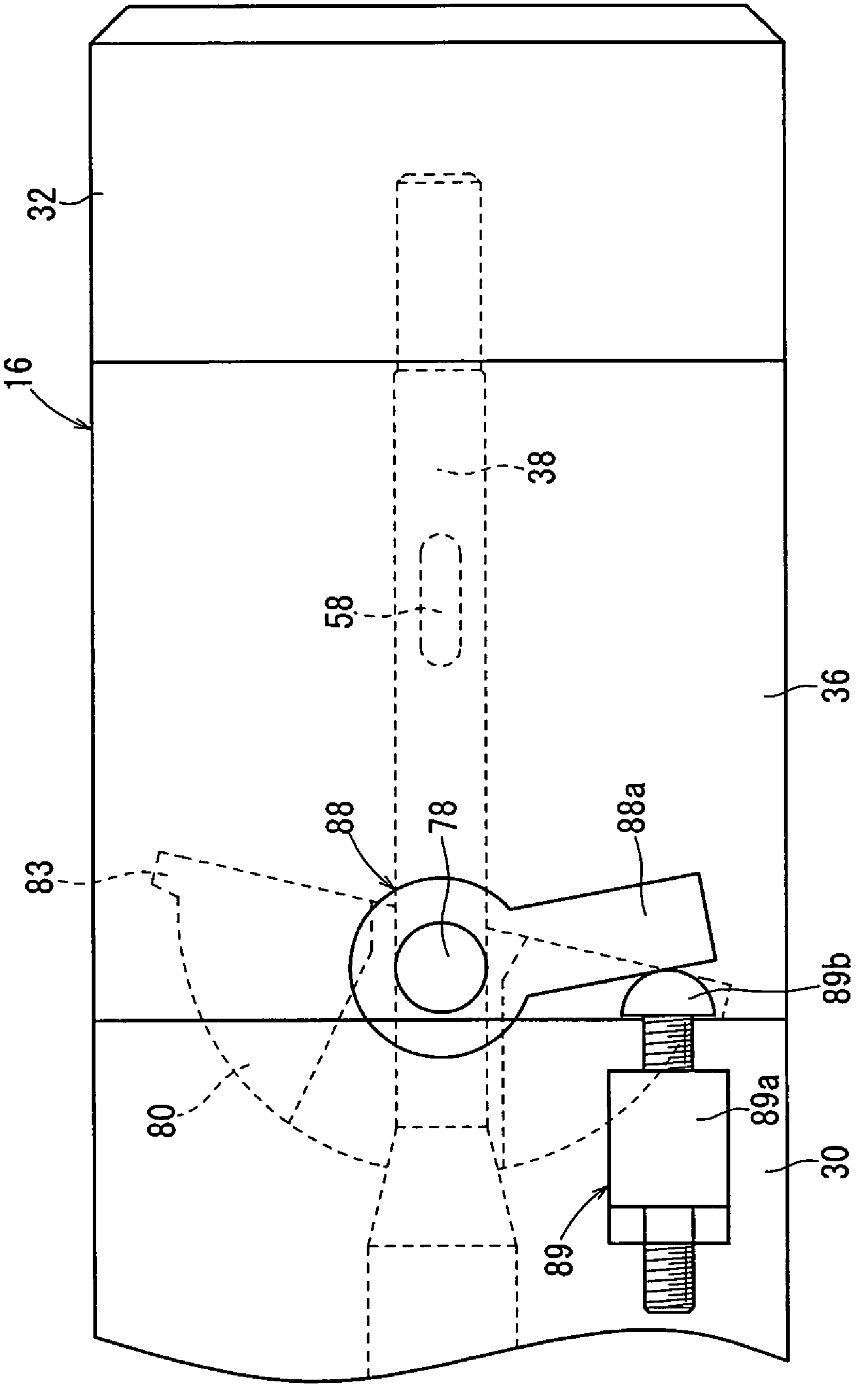
FIG. 4 shows, with partial omission, a magnified plan view illustrating an adjusting lever and a stopper member arranged outside a casing shown in FIG. 1.

As shown in FIG. 4, the adjusting lever 88, which has a keyhole-shaped cross section, is provided rotatably with the aid of the connecting shaft 78 outside the casing 36. When the adjusting lever 88 is rotated by a desired angle, it is possible to change the angle of inclination of the tilting member 80 under the rotary action of the adjusting lever 88. That is, the tilting member 80 and the adjusting lever 88 also function as an adjusting section for adjusting the amount of suction and the amount of discharge of the pressure oil.

A stopper member 89, which is separated from the adjusting lever 88 by a predetermined spacing distance and which regulates the rotary motion of the adjusting lever 88, is provided for the casing 36. The stopper member 89 comprises a main body section 89*a* provided substantially in parallel to the axis of the casing 36, and a stopper pin 89*b* that is screw-engageable displaceably with respect to the main body section 89*a*. The stopper pin 89*b* is positioned so that it is opposed to an arm section 88*a* of the adjusting lever 88.

That is, when the tilting member 80, which is provided in the casing 36, is tilted, then the adjusting lever 88 is integrally rotated by the aid of the connecting shaft 78, and the arm section 88*a* of the adjusting lever 88 abuts against the stopper pin 89*b*. Thus, the tilting action of the tilting member 80 is regulated. The position of the displacement of the stopper pin 89*b* in the axial direction can be adjusted by screw-rotating the stopper pin 89*b*.

On the other hand, as shown in FIG. 2, the pressure oil is supplied via passages 90 communicating with the recesses 70 to the sliding portion between the annular groove 84 of the holding section 86 of the tilting member 80 and the spherical section 68 of the pump pistons 64*a* to 64*g* (see FIG. 3). Thus, the lubricating performance is maintained.

As shown in FIG. 1, the cylinder mechanism 22 is provided substantially in parallel to the axis of the pump-driving section 12 at the side portion of the pump-driving section 12 and the pump mechanism 16. The cylinder mechanism 22 includes a cylindrical cylinder tube 92, first and second cover members 94, 96 which close the ends of the cylinder tube 92 respectively, the piston 18 which is internally installed in the cylinder tube 92 and which is displaceable in the axial direction, and first and second piston rods 20*a*, 20*b* which are coaxially connected to one another with the piston 18 intervening therebetween.

The first cover member 94 is arranged on the side of one end surface of the piston 18 of the cylinder tube 92. The first cylinder chamber 98 is formed between the first cover member 94 and one end surface of the piston 18 disposed in the cylinder tube 92. The first passage 100 is formed in the first cover member 94 at a position opposed to the first fluid passage 54 formed in the end plate 32 of the pump mechanism 16. The first passage 100 extends substantially perpendicularly toward the cylinder tube 92, and communicates with the first cylinder chamber 98.

On the other hand, the second cover member 96 is arranged on the other end of the piston 18 of the cylinder tube 92. The second cylinder chamber 102 is formed between the second cover member 96 and the opposite surface of the piston 18 disposed in the cylinder tube 92. The second passage 104 is formed in the second cover member 96 at a position opposed to the second fluid passage 56 formed in the end plate 32 of the pump mechanism 16. The second passage 104 extends substantially perpendicularly toward the cylinder tube 92, and it communicates with the second cylinder chamber 102.

That is, the first cylinder chamber 98 communicates with the first fluid passage 54 of the pump mechanism 16 via the first passage 100. The pressure oil, which is contained in the pressure oil-charging chamber 34 of the pump mechanism 16, is supplied and discharged via the first passage 100 and the first fluid passage 54. Similarly, the second cylinder chamber 102 also communicates with the second fluid passage 56 of the pump mechanism 16 via the second passage 104. The pressure oil, which is contained in the pressure oil-charging chamber 34, is supplied and discharged via the second passage 104 and the second fluid passage 56.

The piston 18 is provided with an annular piston packing 106 disposed in an annular groove on the outer circumferential surface inscribing the cylinder tube 92. Further, an annular wear ring 108, which is separated from the piston packing 106 by a predetermined spacing distance, is provided. Accordingly, a liquid-tight condition is retained for the first cylinder chamber 98 and the second cylinder chamber 102 respectively with the aid of the piston packing 106 and the wear ring 108. The piston 18 is provided displaceably in the axial direction under the action of the pressure oil to be supplied to the first cylinder chamber 98 and the second cylinder chamber 102.

A threaded screw hole 110 is formed at a substantially central portion of the piston 18. One end of a long first piston rod 20*a* is screw-engaged on the side of the first cover member 94 of the piston 18. The other end of the first piston rod 20*a* is supported displaceably in the axial direction by the aid of a first support hole 112 of the first cover member 94.

On the other hand, one end of the second piston rod 20*b* is connected to a substantially central portion on the opposite side of the piston 18 by the aid of a screw hole 110. The other end of the second piston rod 20*b* is supported displaceably in the axial direction by the aid of a second support hole 114 of the second cover member 96.

A plurality of annular grooves, which are separated from each other by predetermined spacing distances respectively, are formed in the first and second support holes 112, 114. A first rod packing 116, a dust-removing member 118*a*, a second rod packing 120, a dust-removing member 118*b*, and a dust seal 122 are installed, in that order, to each of the plurality of annular grooves in a direction away from the piston 18 from the side of the piston 18. A bush 46 is provided on an annular groove disposed at a portion of each of the first and second support holes 112, 114 disposed nearest to the piston 18.

The first rod packing 116 is formed to have a substantially rectangular cross section, and retains a liquid-tight condition with respect to the pressure oil to be supplied into the first cylinder chamber 98 and the second cylinder chamber 102.

The second rod packing 120 is formed to have a substantially circular cross section, and retains an air-tight condition with respect to the first cylinder chamber 98 and the second cylinder chamber 102. Therefore, the interior of each of the first cylinder chamber 98 and the second cylinder chamber 102 is prevented from being subjected to any internal invasion of gas from the outside.

On the other hand, the pair of dust-removing members 118*a*, 118*b* are provided which interpose the second rod packing 120 therebetween. The dust-removing member 118*a*, 118*b* is formed of, for example, a resin material. The annular groove, to which the dust-removing members 118*a*, 118*b* are installed, communicates with an oil supply passage (not shown) which is open to the outer circumferential surface of each of the first and second cover members 94, 96. A lubricant (for example, grease) is supplied to the annular groove via the oil supply passage.

That is, when the lubricant is supplied to the annular groove, the lubricant is contained while permeating the dust-removing members 118*a*, 118*b*. Further, when the lubricant is supplied to the space between the inner circumferential surface of each of the first and second support holes 112, 114 and the outer circumferential surface of each of the first and second piston rods 20*a*, 20*b*, an oil film is formed. As a result, the first and second piston rods 20*a*, 20*b* can be smoothly displaced in the axial direction under the lubricating action effected by the lubricant. Further, it is possible to prevent rusting of the first and second piston rods 20*a*, 20*b*.

The dust-removing members 118*a*, 118*b*, in which the lubricant is contained, can be used to exclude any invasion of dust or the like from the outside into the inside of each of the first cylinder chamber 98 and the second cylinder chamber 102. Further, it is possible to improve the durability of the dust-removing members 118*a*, 118*b* by the aid of the lubricant.

On the other hand, when the first piston rod 20*a* is displaced to protrude and be exposed to the outside from the first cover member 94, or when the second piston rod 20*b* is displaced to protrude and be exposed to the outside from the second cover member 96, then dust or the like can adhere to the outer circumferential surface of each of the first and second piston rods 20*a*, 20*b*. Also in such a case, the first and second piston rods 20*a*, 20*b* are displaced into the inside of the first and second cover members 94, 96 again, and thus such dust or the like adhering to the outer circumferential surface as described above, is removed by the dust seals 122 abutting against the outer circumferential surface. Accordingly, it is possible to preclude any invasion of dust or the like into the first cylinder chamber 98 and the second cylinder chamber 102.

Further, the bushes 46 support the first and second piston rods 20*a*, 20*b* displaceably in the axial direction in the first and second support holes 112, 114.

The actuator 10 according to the first embodiment of the present invention is basically constructed as described above. Next, its operation, function, and effect will be explained. It is assumed that the pressure oil has been charged into the pressure oil-charging chamber 34 from the unillustrated pressure oil supply source.

The unillustrated power source is energized to drive and rotate the rotary driving source 24 of the pump-driving section 12. The drive shaft 26 is rotated under the driving action of the rotary driving source 24, and the rotary shaft 38, which is connected to the drive shaft 26, is integrally rotated.

The cylinder block 60, which is fitted to the rotary shaft 38 with the aid of the key member 58, is integrally rotated. The pump pistons 64*a* to 64*g*, which are provided displaceably in the holes 44*a* to 44*g* of the cylinder block 60 respectively, are rotated about the center of the rotary shaft 38. The pump pistons 64*a* to 64*g* are displaced in the axial direction (direction of arrow A or B) with the aid of the resilient force of the springs 72, in a state in which the spherical sections 68 of the pump pistons 64*a* to 64*g* are retained in the annular groove 84 of the holding section 86 of the tilting member 80.

During this process, pressure oil is charged into one of the chambers 74, for example, the chamber 74 surrounded by the pump piston 64*a* and the hole 44*a*, as shown in FIG. 2. Conversely, pressure oil, which has been charged in the chamber 74 surrounded by the pump piston 64*e* and holes 44*e*, is discharged to the first fluid passage 54 via the pressure oil hole 66. When the pump piston 64*a* is driven and rotated integrally with the cylinder body 60 to arrive at the bottom dead center position on the side nearest to the end plate 32 (in the direction of the arrow B) under the pressing action effected by the tilting member 80, the pressure oil, which has been charged in the chamber 74, is discharged to the first fluid passage 54 under the displacement action of the pump piston 64*a* toward the end plate 32.

Conversely, for example, when the pump piston 64*e* is driven and rotated integrally with the cylinder body 60 to be displaced to the top dead center position toward the side nearest to the pump-driving section 12 (in the direction of the arrow A) under the action of the resilient force of the spring 72, the pressure oil is sucked into the chamber 74 via the pressure oil hole 66 under the displacement action of the pump piston 64*e* toward the pump-driving section 12.

This process will be explained in detail below. That is, when any one of the pump pistons 64*a* to 64*g* is displaced to the position opposed to the first fluid passage 54 formed in the end plate 32, then that pump piston is displaced until arrival at the bottom dead center position nearest to the end plate 32 (in the direction of the arrow B) under the pressing action effected by the tilting member 80. Thus, the pressure oil, which has been charged in the chamber 74, is discharged through the pressure oil hole 66. Conversely, when any one of the pump pistons 64*a* to 64*g* is displaced to the position opposed to the second fluid passage 56, then that pump piston is displaced until arrival at the top dead center position nearest to the pump-driving section 12 (in the direction of the arrow A). Thus, the pressure oil is sucked into the chamber 74 through the pressure oil hole 66. That is, the pump pistons 64*a* to 64*g* are rotated about the center of the rotary shaft 38 while repeating the suction and the discharge with respect to the interior of the chambers 74 by repeating the displacement in the axial direction under the rotary action of the rotary shaft 38.

The pressure oil, which is discharged by the pump pistons 64*a* to 64*g*, flows to the first passage 100 formed in the first cover member 94 and the cylinder tube 92 via the first fluid passage 54 formed in the end plate 32, and the pressure oil is supplied to the first cylinder chamber 98 of the cylinder mechanism 22. The piston 18 is pressed toward the second cover member 96 (in the direction of the arrow A) by the pressure oil supplied to the first cylinder chamber 98. Accordingly, the first and second piston rods 20*a*, 20*b* are integrally displaced in the direction of the arrow A.

On the other hand, conversely to the above, when the piston 18 of the cylinder mechanism 22 and the first and second piston rods 20*a*, 20*b* are displaced toward the pump mechanism 16 (in the direction of the arrow B), the polarity of the current supplied to the rotary driving source 24 is reversed. Accordingly, the rotary shaft 38, which is connected to the drive shaft 26 of the rotary driving source 24, is integrally rotated in a direction opposite to that described above. Therefore, the cylinder block 60 of the pump mechanism 16 is rotated in an opposite direction by the rotary shaft 38. The pressure oil is sucked from the first cylinder chamber 98 via the first fluid passage 54 under the displacement action of the pump pistons 64*a* to 64*g*, and the pressure oil is discharged to the second fluid passage 56 under the displacement action of the pump pistons 64*a* to 64*g*.

The pressure oil, which has been discharged to the second fluid passage 56 formed in the end plate 32, is supplied to the second cylinder chamber 102 of the cylinder mechanism 22 via the second passage 104 formed in the cylinder tube 92, and the pressure in the second cylinder chamber 102 increases. During this process, the pressure oil, which has been introduced into the first cylinder chamber 98, is discharged via the first passage 100 under the sucking action effected by the pump pistons 64*a* to 64*g* of the pump mechanism 16. The pressure oil returns to the pressure oil-charging chamber 34 via the first fluid passage 54.

As a result, the piston 18 of the cylinder mechanism 22 is displaced toward the first cover member 94 (in the direction of the arrow B) by the pressure of the pressure oil supplied to the second cylinder chamber 102. The first and second piston rods 20*a*, 20*b* are integrally displaced in the direction of the arrow B by the displacement action of the piston 18.

Next, an explanation will be made of a situation in which a load is applied from the outside to the piston 18 through the first or second piston rod 20*a*, 20*b*. For example, when the piston 18 is displaced toward the second cover member 96 (in the direction of the arrow A), if any load (pressing force) is applied in the direction of the arrow B to the second piston rod 20*b*, then the piston 18 is pressed in the direction of the arrow B by the pressing force. Accordingly, the pressure of pressure oil supplied to the first cylinder chamber 98 increases. Hence, the rotational load exerted on the sucking/discharging section 14 of the pump mechanism 16 for supplying the pressure oil to the first cylinder chamber 98 also increases.

During this process, the tilting member 80 and the adjusting lever 88 are rotated in the direction in which the angle of inclination of the tilting member 80 decreases depending on the rotational load. Accordingly, the displacement of the pump pistons 64*a* to 64*g* in the axial direction decreases as the angle of inclination of the tilting member 80 decreases. As a result, the supply of the pressure oil to the first cylinder chamber 98 supplied by pump mechanism 16 decreases. Accordingly, the displacement speed drops when the piston 18 is displaced in the direction of the arrow A, and the displacement force (thrust force) increases when the piston 18 is displaced.

As a result, the amount of discharge of the pressure oil is decreased by inclining the tilting member 80, and thus the displacement force (thrust force) increases when the piston 18 is displaced, which makes it possible to reliably displace the piston 18 and the first and second piston rods 20*a*, 20*b* in the axial direction against the load exerted on the piston 18 from the outside.

The same or equivalent operation is also performed when a load (pressing force) is applied to the first piston rod 20*a* in the direction of the arrow A, similarly to the situation when the piston 18 is displaced toward the first cover member 94 (in the direction of the arrow B).

Conversely to the above, when no load is applied at all from the outside to the piston 18 (no load state), no rotational load is generated on the sucking/discharging section 14 of the pump mechanism 16 which supplies the pressure oil to the first cylinder chamber 98 or the second cylinder chamber 102. Therefore, the rotation is made while the angle of inclination of the tilting member 80 increases.

The displacement of the pump piston 64*a* to 64*g* in the axial direction increases under the tilting action of the tilting member 80. Therefore, the supply of the pressure oil to the first cylinder chamber 98 or the second cylinder chamber 102 is increased by the pump mechanism 16. Accordingly, the displacement speed of the piston 18 in the direction of the arrow A or B increases, and the displacement force (thrust force) decreases, when the piston 18 is displaced. That is, the amount of discharge of the pressure oil is increased by changing the angle of inclination of the tilting member 80, and thus no load is generated on the piston 18 from the outside. Therefore, the piston 18 and the first and second piston rods 20*a*, 20*b* can be reliably displaced in the axial direction in a state in which the displacement force (thrust force) of the piston 18 in the axial direction is small and the displacement speed is increased.

When the tilting member 80, which is provided in the casing 36, is tilted about the support point of the connecting shaft 78, then the arm section 88*a* of the adjusting lever 88 connected to the tilting member 80 by the aid of the connecting shaft 78 abuts against the forward end of the stopper pin 89*b* of the stopper member 89. Accordingly, the tilting member 80 is prevented from any further tilting action.

As described above, in the first embodiment, the tilting member 80 is provided tiltably in the casing 36 with the aid of the connecting shaft 78, and the tilting member 80 is integrally connected to the adjusting lever 88 provided outside the casing 36 with the aid of the connecting shaft 78. That is, the tilting member 80, which is provided tiltably depending on the pressure of the pressure fluid contained in the first cylinder chamber 98 or the second cylinder chamber 102 of the cylinder mechanism 22, has an angle of inclination which changes depending on the pressure state. Therefore, the pump pistons 64*a* to 64*g*, each of which comprises a spherical section 68 retained by a holding section 86, provides a displacement amount which is changeable under the tilting action of the tilting member 80. Therefore, it is possible to adjust the amount of discharge of pressure oil from the pump pistons 64*a* to 64*g* to the first cylinder chamber 98 or the second cylinder chamber 102 of the cylinder mechanism 22.

As a result, it is possible to adjust the supply of pressure oil to the cylinder mechanism 22. Moreover, it is possible to freely adjust the output including, for example, the displacement force (thrust force) and the displacement speed of the piston 18 and the first and second piston rods 20*a*, 20*b* of the cylinder mechanism 22.

Therefore, even when a load is applied from the outside to the first and second piston rods 20*a*, 20*b*, it is possible to respond to any situation conveniently and quickly by adjusting the output of the cylinder mechanism 22 under the tilting action of the tilting member 80.

Further, the pump mechanism 16 for sucking and discharging the pressure oil and the pump-driving section 12 for driving the pump mechanism 16 are coaxially connected, and the cylinder mechanism 22 is integrally provided on the pump mechanism 16 and the pump-driving section 12. Accordingly, the actuator 10 may be small in size.

Further, the piston 18 is displaced by the pressure oil supplied to the first cylinder chamber 98 and the second cylinder chamber 102 of the cylinder mechanism 22. Therefore, it is possible to increase the displacement force (thrust force) of the first and second piston rods 20*a*, 20*b*.

Figure 5:
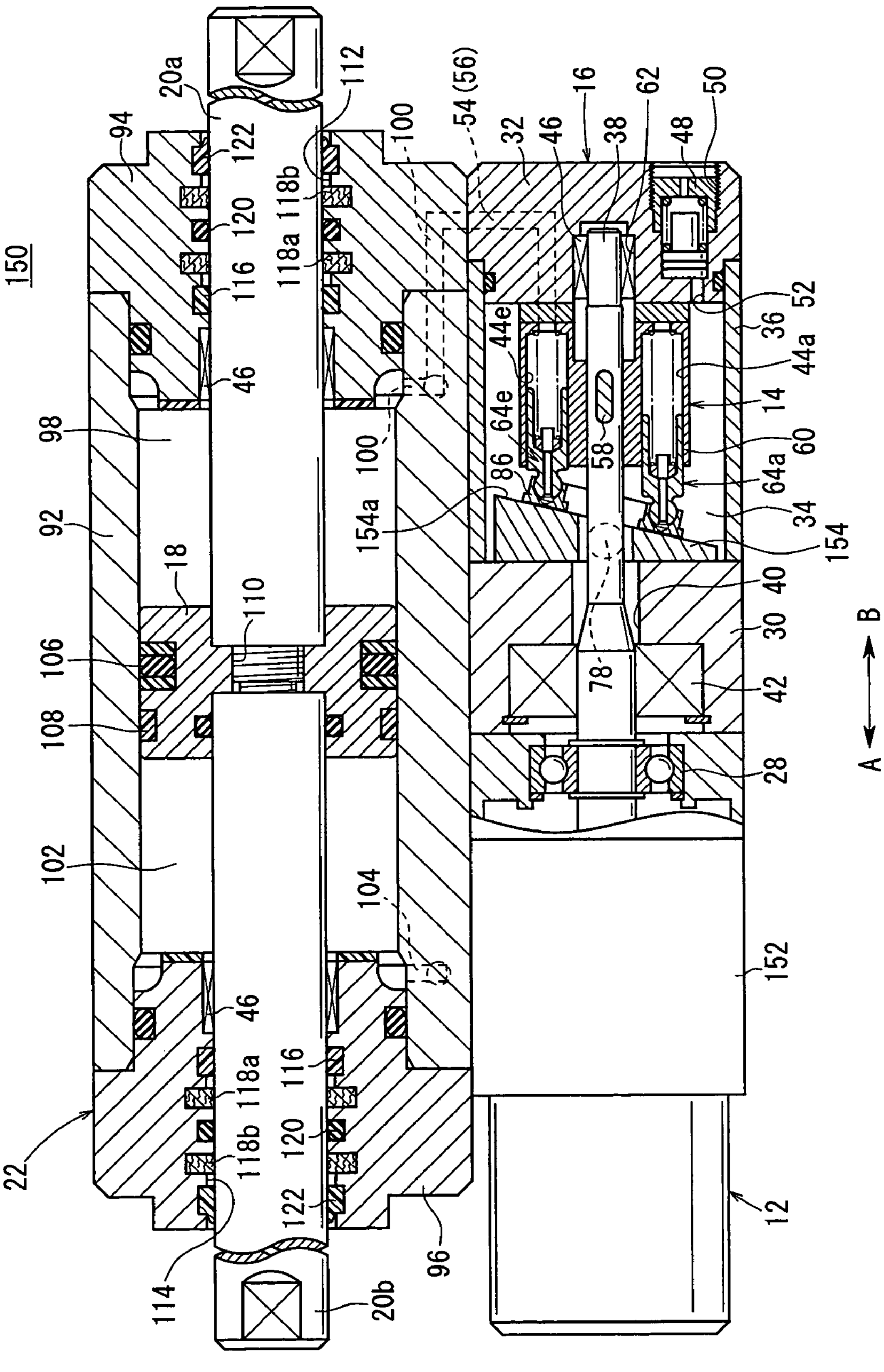
FIG. 5 shows a longitudinal sectional view illustrating an actuator according to a second embodiment of the present invention.

Next, an actuator 150 according to a second embodiment is shown in FIG. 5. The same constitutive components or parts as those of the actuator 10 according to the first embodiment described above are designated by the same reference numerals, and hence detailed explanation thereof shall be omitted.

The actuator 150 according to the second embodiment is different from the actuator 10 according to the first embodiment in that the actuator 150 includes a speed change mechanism (adjusting section) 152 which is provided between the pump-driving section 12 and the pump mechanism 16, for transmitting the rotational speed of the pump-driving section 12 to the pump mechanism 16 after accelerating or decelerating the rotational speed, and an inclined member (fixed member) 154 which has a fixed angle of inclination.

As shown in FIG. 5, the speed change mechanism 152 (for example, a gear mechanism), which is connected between the pump-driving section 12 and the pump mechanism 16, has one end connected to the drive shaft 26 of the unillustrated rotary driving source 24 and another end connected to the rotary shaft 38 of the pump mechanism 16. The driving force is transmitted to the speed change mechanism 152 via the drive shaft 26 under the rotary action of the rotary driving source 24. During this process, the rotational speed of the drive shaft 26 is accelerated or decelerated to a desired rotational speed by the speed change mechanism 152 connected to the drive shaft 26. The rotational speed is transmitted to the pump mechanism 16 via the rotary shaft 38 connected to the speed change mechanism 152 after achieving the desired rotational speed with the aid of the speed change mechanism 152.

That is, the rotational speed of the cylinder block 60 fitted to the rotary shaft 38 can be accelerated or decelerated by changing the rotational speed of the rotary shaft 38. Therefore, the speed change mechanism 152 can be used to freely adjust the amount of pressure oil supplied to the cylinder mechanism 22 by the sucking/discharging section 14. Therefore, it is possible to freely adjust the displacement speed and the displacement force (thrust force) of the piston 18 and the first and second piston rods 20*a*, 20*b* of the cylinder mechanism 22.

The inclined member 154 is secured to the side surface of the pump body 30 on the side of the end plate 32. The holding section 86, retaining each of the spherical sections 68 of the pump pistons 64*a* to 64*g*, is formed while being inclined by a substantially constant angle with respect to the side surface. In other words, the inclined surface 154*a* of the inclined member 154 is inclined to gradually approach the end plate 32 as its position approaches the cylinder mechanism 22 while being attached to the attachment surface of the pump body 30.

Next, an explanation shall be given concerning a case in which a load is applied to the piston 18 via the first and second piston rods 20*a*, 20*b*.

For example, when a load (pressing force) is applied in the direction of the arrow B to the second piston rod 20*b* while the piston 18 moves toward the second cover member 96 (in the direction of the arrow A), the piston 18 is pressed by the pressing force in the direction of the arrow B. Therefore, the pressure of the pressure oil supplied to the first cylinder chamber 98 increases, which in turn increases the rotational load on the sucking/discharging section 14 of the pump mechanism 16 which supplies the pressure oil into the first cylinder chamber 98.

In this situation, the speed change mechanism 152, which is connected to the rotary shaft 38, is used to lower the rotational speed of the rotary shaft 38 depending on the rotational load. That is, the amount of pressure oil discharged by the pump pistons 64*a* to 64*g* is decreased by lowering the rotational speed of the rotary shaft 38 to decrease the amount of supply of the pressure oil to the first cylinder chamber 98 supplied by the pump mechanism 16. Accordingly, the displacement speed of the piston 18 in the direction of the arrow A is lowered, and the displacement force (thrust force) is increased when the piston 18 is displaced. As a result, the rotational speed of the rotary shaft 38 is lowered to decrease the discharge amount of the pressure oil by using the speed change mechanism 152, and thus the displacement force (thrust force) is increased when the piston 18 is displaced, making it possible to reliably displace the piston 18 and the first and second piston rods 20*a*, 20*b* in the axial direction against the load applied to the piston 18 from the outside.

The same or equivalent operation is also performed when a load (pressing force) is applied to the first piston rod 20*a* in the direction of the arrow A when the piston 18 is displaced toward the first cover member 94 (in the direction of the arrow B).

Conversely to the above, when no load is applied at all from the outside to the piston 18 (no load state), no rotational load is generated on the sucking/discharging section 14 of the pump mechanism 16 which supplies the pressure oil into the first cylinder chamber 98 or the second cylinder chamber 102. Therefore, the speed change mechanism 152 increases the rotational speed of the rotary shaft 38.

The rotational speed of the rotary shaft 38 is increased by the speed change mechanism 152 to increase the amount of pressure oil discharged by the pump pistons 64*a* to 64*g*. Accordingly, the supply of pressure oil to the first cylinder chamber 98 or the second cylinder chamber 102 is increased by the pump mechanism 16. Accordingly, the displacement speed of the piston 18 in the direction of the arrow A or B increases, and the displacement force (thrust force) decreases, when the piston 18 is displaced.

That is, the amount of pressure oil discharged is increased by increasing the rotational speed of the rotary shaft 38 with the speed change mechanism 152, and thus no load is generated on the piston 18 from the outside. Therefore, the piston 18 and the first and second piston rods 20*a*, 20*b* can be reliably displaced in the axial direction in the state in which the displacement force (thrust force) of the piston 18 in the axial direction is small and the displacement speed is increased.

In the first and second embodiments, the cylinder mechanism 22 is driven with the pressure oil. However, the invention is not limited to using pressure oil. For example, the cylinder mechanism 22 may be driven by using any pressure fluid including compressed air.

Figure 6:
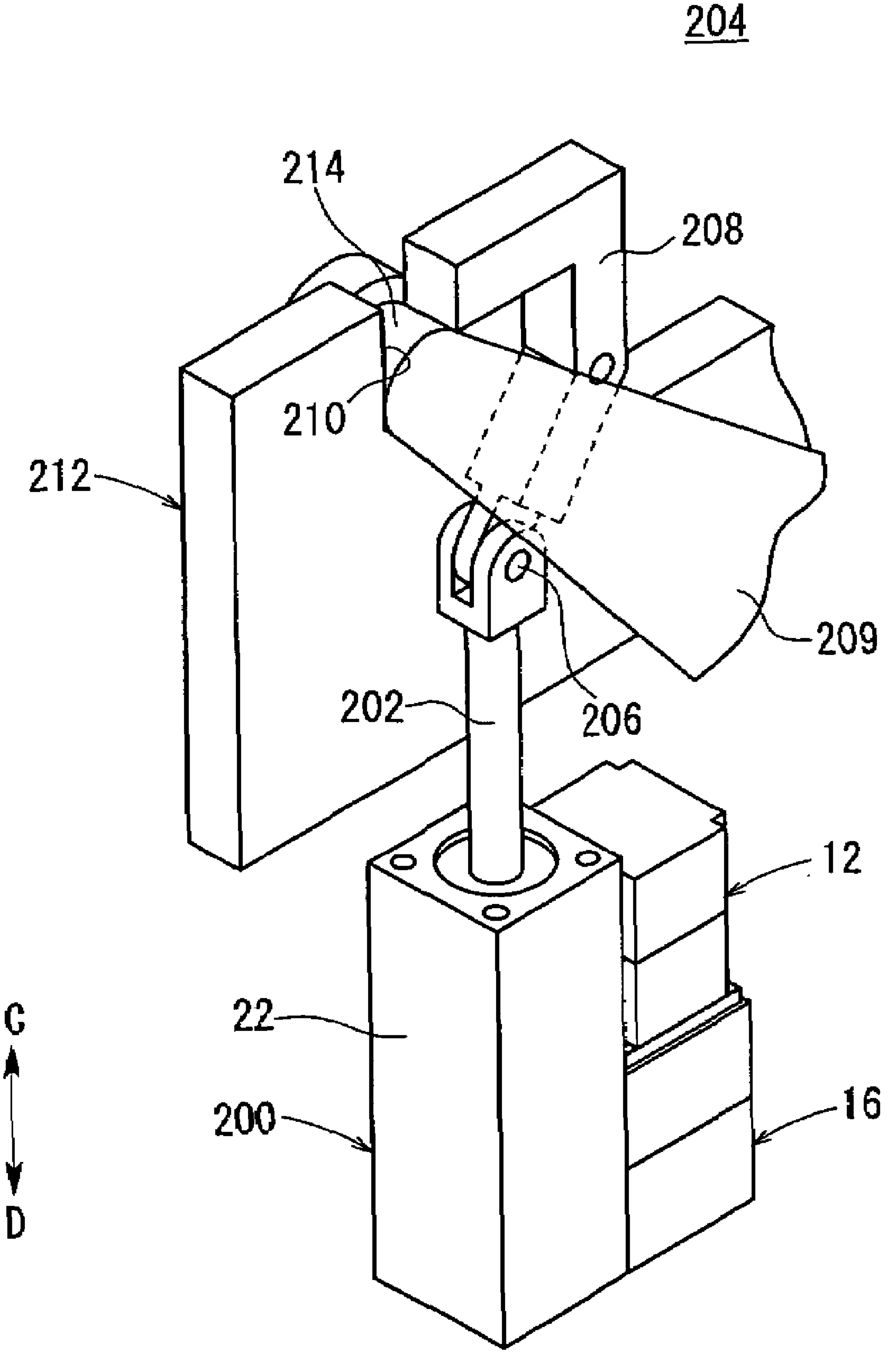
FIG. 6 shows, with partial omission, a perspective view illustrating a workpiece-gripping mechanism to which an actuator according to a third embodiment of the present invention is applied.
Figure 7:
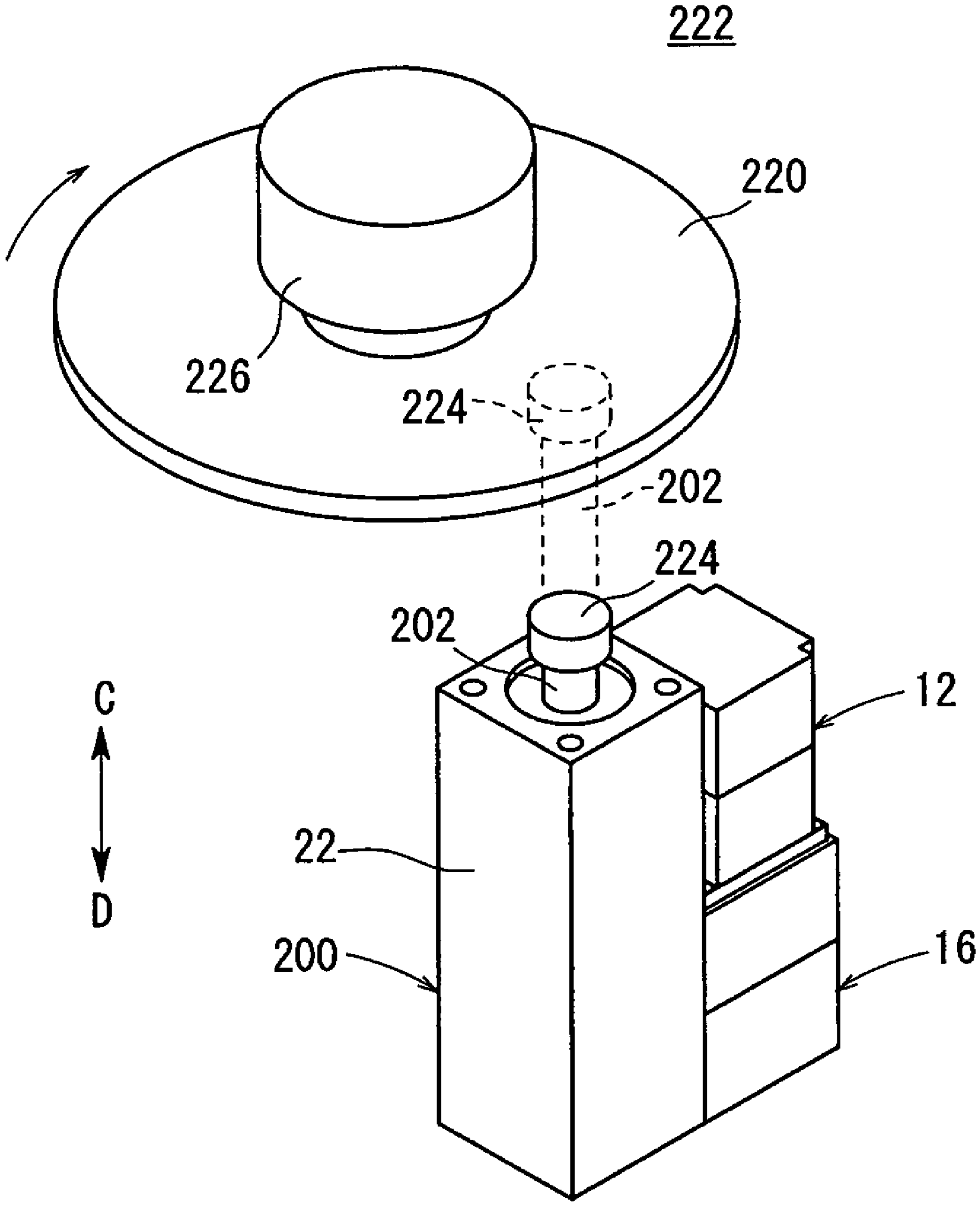
FIG. 7 shows, with partial omission, a perspective view illustrating a brake mechanism to which the actuator shown in FIG. 6 is applied.

Next, an actuator 200 according to a third embodiment is shown in FIGS. 6 and 7. The same constitutive components or parts as those of the actuator 10 according to the first embodiment described above are designated by the same reference numerals, and detailed explanation thereof shall be omitted.

The actuator 200 according to the third embodiment is different from the actuator 10 according to the first embodiment in that the actuator 200 has a single piston rod 202 which is connected to the piston 18 (see FIG. 1) of the cylinder mechanism 22, and which is displaceable integrally with the piston 18 by the pressure of the pressure oil supplied to the cylinder mechanism 22.

First, with reference to FIG. 6, an explanation shall be given concerning a case in which the actuator 200 is applied to a workpiece-gripping mechanism 204 for gripping a workpiece 209 under the displacement action of the cylinder mechanism 22 in the axial direction.

The workpiece-gripping mechanism 204 comprises the actuator 200, a gripping arm 208 which is rotatably supported at an end of a piston rod 202 of the actuator 200 with the aid of a pin 206, and a support member 212 which is formed with a recess 210 for engaging the workpiece 209.

When an annular groove 214 of the workpiece 209 is engaged with the recess 210 of the support member 212, and the piston rod 202 of the actuator 200 is displaced upwardly (in the direction of the arrow C) in the axial direction, then the gripping arm 208, which is rotatably supported at the end of the piston rod 202, is rotated about the support point of the pin 206, while the gripping arm 208 engages with the annular groove 214 of the workpiece 209. That is, the annular groove 214 of the workpiece 209 is engaged by the gripping arm 208 and the recess 210 of the support member 212, and hence it is possible to appropriately retain the workpiece 209.

When the piston rod 202 is displaced downwardly (in the direction of the arrow D) in the axial direction under the driving action of the cylinder mechanism 22, then the gripping arm 208 is rotated in a direction so as to separate from the workpiece 209 about the support point of the pin 206, and the gripping arm 208 separates from the annular groove 214 of the workpiece 209 to release the workpiece 209.

Next, with reference to FIG. 7, an explanation shall be given concerning a case in which the actuator 200 is used as a brake mechanism 222, for braking a disk 220, which is rotated under the displacement action in the axial direction of the cylinder mechanism 22.

The brake mechanism 222 comprises the actuator 200, a substantially circular braking member 224 which is provided at the end of the piston rod 202 of the actuator 200, the disk 220 which is driven and rotated at a position opposed to the braking member 224, and a rotary shaft 226 which drives and rotates the disk 220.

While the disk 220 is driven and rotated with the aid of the rotary shaft 226, the piston rod 202 of the actuator 200 is displaced in the axial direction (in the direction of the arrow C) toward the disk 220, and the braking member 224, which is provided at the forward end of the piston rod 202, abuts against the disk 220. Accordingly, the rotation of the disk 220 can be braked by the contact between the braking member 224 and the disk 220.

When the piston rod 202 of the actuator 200 is displaced in the axial direction, in a direction (direction of the arrow D) to come out of contact with the disk 220, the braking member 224 separates from the disk 220, and the disk 220 is released from the braked state.

Figure 8:
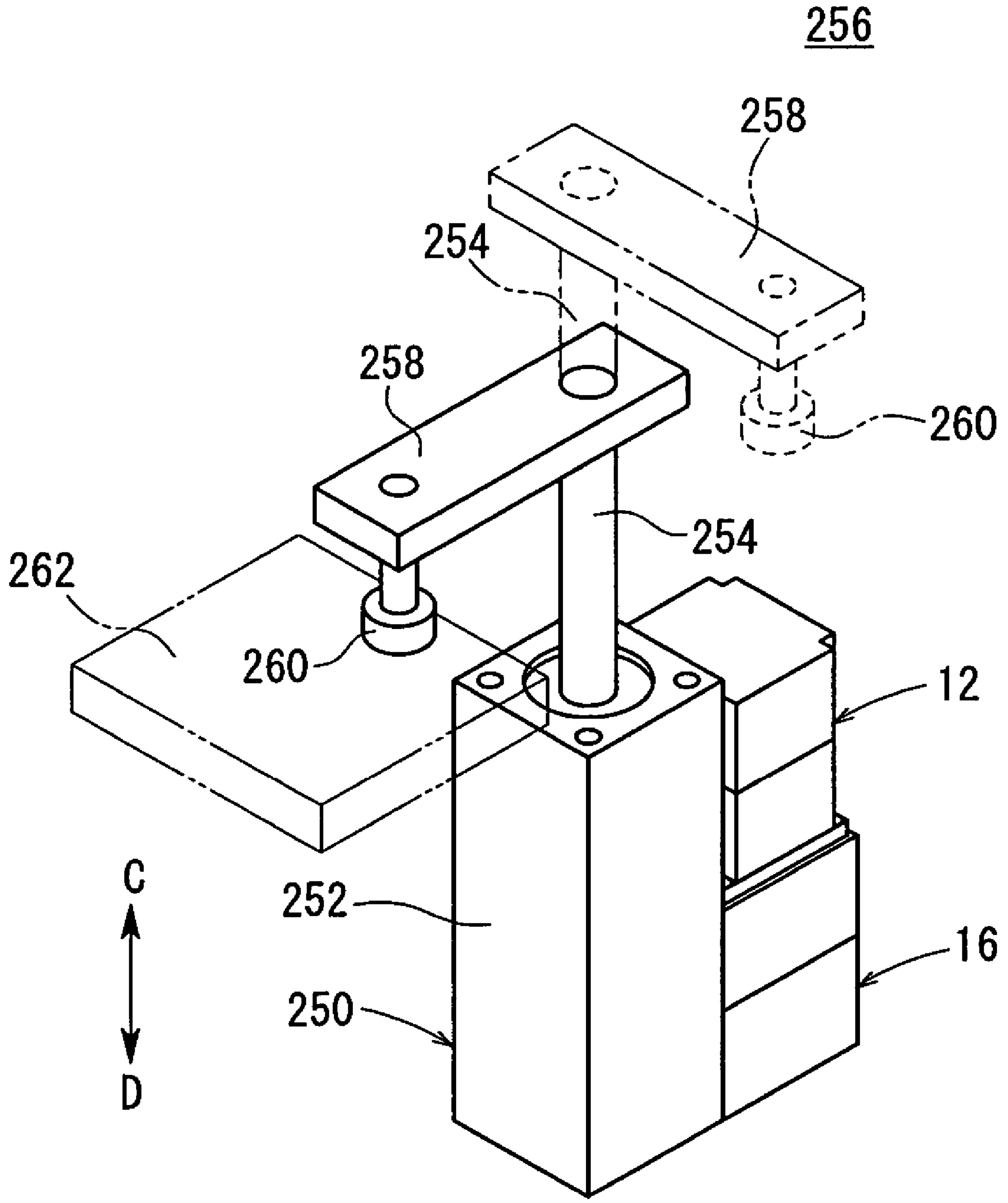
FIG. 8 shows, with partial omission, a perspective view illustrating a clamp mechanism to which an actuator according to a fourth embodiment of the present invention is applied.

Next, an actuator 250 according to a fourth embodiment is shown in FIG. 8. The same constitutive components or parts as those of the actuator 10 according to the first embodiment described above are designated by the same reference numerals, and detailed explanation thereof shall be omitted.

The actuator 250 according to the fourth embodiment is different from the actuator 10 according to the first embodiment in that the actuator 250 has a cylinder mechanism 252 which is displaceable in the axial direction (direction of arrow C or D) while rotating a piston rod 254, in place of the cylinder mechanism 22 (see FIGS. 6 and 7) which is displaceable in only the axial direction (direction of arrow C or D). The fourth embodiment also differs in that the actuator 250 has a single piston rod 254, which is displaceable integrally with the piston 18 (see FIG. 1) under the pressing action of the pressure oil supplied to the cylinder mechanism 252.

With reference to FIG. 8, an explanation shall be given concerning a case in which the actuator 250 is applied to a clamp mechanism 256, which clamps a workpiece 262 while being subjected to a rotary displacement action and while also moving in the axial direction (direction of arrow C or D) of the cylinder mechanism 252.

The clamp mechanism 256 comprises the actuator 250, a plate 258 which is connected substantially perpendicularly to the end of the piston rod 254 of the actuator 250, and a clamp pin 260 which is provided substantially in parallel while being separated by a predetermined spacing distance from the piston rod 254 and which is connected to the plate 258.

When the workpiece 262, which is placed on an unillustrated placement stand, is clamped by using the clamp mechanism 256, the piston rod 254 is displaced downwardly (in the direction of the arrow D) under the driving action of the cylinder mechanism 252 while also rotating, starting from a state (position indicated by two-dot chain lines as shown in FIG. 8) in which the plate 258 and the clamp pin 260 are displaced upwardly (in the direction of the arrow C) by the aid of the piston rod 254. Accordingly, the lower end of the clamp pin 260 abuts against the upper surface of the workpiece 262 placed on the placement stand.

As a result, the workpiece 262 is reliably clamped between the unillustrated placement stand and the clamp pin 260. When the workpiece 262 is released from the clamped state, such releasing can be achieved by displacing the piston rod 254 of the cylinder mechanism 252 upwardly (in the direction of the arrow C) while rotating the piston rod 254 of the cylinder mechanism 252.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An actuator comprising:

a pump mechanism which sucks/discharges a pressure fluid by displacing pump pistons in an axial direction in accordance with a rotary driving force of a pump-driving section to be driven and rotated by an electric signal; and a driving mechanism including a displaceable member which is displaceable in said axial direction by pressure of said pressure fluid to be supplied from said pump mechanism, wherein:

said pump mechanism and said driving mechanism are provided in an integrated manner, and said pump mechanism includes an adjusting section which is provided in said pump mechanism and which adjusts an amount of discharge of said pressure fluid supplied to said driving mechanism;

said adjusting section comprises a tilting member which is rotatably supported tiltably by a body of said pump mechanism and which is engaged with said pump piston, wherein an amount of displacement of said pump piston in said axial direction is adjusted by a tilting action of said tilting member;

said driving mechanism includes first and second cylinder chambers in which said displaceable member is provided displaceably, and said first and second cylinder chambers communicate with an interior of said pump mechanism via first and second passages respectively; and said first and second passages are formed in an end plate of said pump mechanism and a cylinder tube and a cover member of said driving mechanism.

2. The actuator according to claim 1, wherein said tilting member is connected via a connecting shaft to a rotatable member which is provided outside said body, and an angle of inclination of said tilting member is adjustable by the aid of said rotatable member.

3. The actuator according to claim 2, wherein an arm section, which protrudes radially outwardly from a portion supported by said connecting shaft, is formed for said rotatable member.

4. The actuator according to claim 3, wherein said pump mechanism is provided with a stopper mechanism for regulating a tilting action of said tilting member connected to said rotatable member by rotating and displacing said arm section of said rotatable member to make abutment.

5. The actuator according to claim 4, wherein said stopper mechanism includes a main body section which is fixed to said body and a stopper pin which is screw-engaged with said main body section displaceably in said axial direction and which makes abutment against said rotatable member.

6. The actuator according to claim 1, wherein said pump mechanism is provided with a pressure-adjusting mechanism for adjusting a pressure of said pressure fluid in said pump mechanism.

7. The actuator according to claim 6, wherein:

said pressure-adjusting mechanism comprises a pressure-adjusting plug which is screw-engaged with an installation hole communicating with an interior of said body; and said pressure of said pressure fluid contained in said body is adjusted by screw-rotating said pressure-adjusting plug.

8. The actuator according to claim 1, wherein said driving mechanism is juxtaposed with said pump mechanism.

9. The actuator according to claim 1, wherein said pump mechanism comprises:

said pump piston which is retained by said tilting member, a cylinder body which is secured to a rotary shaft connected to a driving shaft of said pump-driving section and which retains said pump piston displaceably in said axial direction, and a spring which is interposed between said pump piston and said cylinder body; and a chamber which is formed between said pump piston and said cylinder body, wherein:

said pump piston is driven and rotated in a circumferential direction about a center of said rotary shaft by the aid of said cylinder body under a rotary action of said rotary shaft.

10. The actuator according to claim 1, wherein said tilting member is formed to have a hemispherical shape, and a through-hole, through which said rotary shaft connected to said drive shaft of said pump-driving section, is formed at a substantially central portion of said tilting member.

11. An actuator comprising:

a pump mechanism which sucks/discharges a pressure fluid by displacing pump pistons in an axial direction in accordance with a rotary driving force of a pump-driving section to be driven and rotated by an electric signal; and a driving mechanism including a displaceable member which is displaceable in said axial direction under pressure of said pressure fluid supplied from said pump mechanism, wherein:

said pump mechanism and said driving mechanism are provided in an integrated manner, and said pump mechanism includes an adjusting section which is provided in said pump mechanism and which adjusts an amount of discharge of said pressure fluid supplied to said driving mechanism;

said adjusting section comprises a fixed member which is engaged with said pump piston, which is fixed in said pump mechanism, and which has an inclined surface inclined by a predetermined angle, and a speed change mechanism which controls an amount of driving rotation transmitted from said pump-driving section to said pump mechanism; and said pump mechanism is provided with a pressure-adjusting mechanism for adjusting a pressure of said pressure fluid in said pump mechanism.

12. The actuator according to claim 11, wherein said speed change mechanism controls an amount of discharge of said pressure fluid from said pump mechanism to said driving mechanism by controlling said amount of driving rotation transmitted from said pump-driving section to said pump mechanism.

13. The actuator according to claim 11, wherein:

said pressure-adjusting mechanism comprises a pressure-adjusting plug which is screw-engaged with an installation hole communicating with an interior of said body; and said pressure of said pressure fluid contained in said body is adjusted by screw-rotating said pressure-adjusting plug.

14. The actuator according to claim 11, wherein said driving mechanism is juxtaposed with said pump mechanism.

15. The actuator according to claim 11, wherein said driving mechanism includes first and second cylinder chambers in which said displaceable member is provided displaceably, and said first and second cylinder chambers communicate with an interior of said pump mechanism via first and second passages respectively.

16. The actuator according to claim 15, wherein said first and second passages are formed in an end plate of said pump mechanism and a cylinder tube and a cover member of said driving mechanism.

17. The actuator according to claim 11, wherein said pump mechanism comprises:

said pump piston which is retained by said fixed member, a cylinder body which is secured to a rotary shaft connected to a driving shaft of said pump-driving section and which retains said pump piston displaceably in said axial direction, and a spring which is interposed between said pump piston and said cylinder body; and a chamber which is formed between said pump piston and said cylinder body, wherein:

said pump piston is driven and rotated in a circumferential direction about a center of said rotary shaft by the aid of said cylinder body under a rotary action of said rotary shaft.

18. An actuator comprising:

a pump mechanism which sucks/discharges a pressure fluid by displacing pump pistons in an axial direction in accordance with a rotary driving force of a pump-driving section to be driven and rotated by an electric signal; and a driving mechanism including a displaceable member which is displaceable in said axial direction by pressure of said pressure fluid to be supplied from said pump mechanism, wherein:

said pump mechanism and said driving mechanism are provided in an integrated manner, and said pump mechanism includes an adjusting section which is provided in said pump mechanism and which adjusts an amount of discharge of said pressure fluid supplied to said driving mechanism;

said adjusting section comprises a tilting member which is rotatably supported tiltably by a body of said pump mechanism and which is engaged with said pump piston, wherein an amount of displacement of said pump piston in said axial direction is adjusted by a tilting action of said tilting member; and said pump mechanism is provided with a pressure-adjusting mechanism for adjusting a pressure of said pressure fluid in said pump mechanism.

19. The actuator according to claim 18, wherein said driving mechanism includes first and second cylinder chambers in which said displaceable member is provided displaceably, and said first and second cylinder chambers communicate with an interior of said pump mechanism via first and second passages respectively.

20. The actuator according to claim 19, wherein said first and second passages are formed in an end plate of said pump mechanism and a cylinder tube and a cover member of said driving mechanism.

21. The actuator according to claim 18, wherein said tilting member is connected via a connecting shaft to a rotatable member which is provided outside said body, and an angle of inclination of said tilting member is adjustable by the aid of said rotatable member.

22. The actuator according to claim 21, wherein an arm section, which protrudes radially outwardly from a portion supported by said connecting shaft, is formed for said rotatable member.

23. The actuator according to claim 22, wherein said pump mechanism is provided with a stopper mechanism for regulating a tilting action of said tilting member connected to said rotatable member by rotating and displacing said arm section of said rotatable member to make abutment.

24. The actuator according to claim 23, wherein said stopper mechanism includes a main body section which is fixed to said body and a stopper pin which is screw-engaged with said main body section displaceably in said axial direction and which makes abutment against said rotatable member.

25. The actuator according to claim 18, wherein:

said pressure-adjusting mechanism comprises a pressure-adjusting plug which is screw-engaged with an installation hole communicating with an interior of said body; and said pressure of said pressure fluid contained in said body is adjusted by screw-rotating said pressure-adjusting plug.

26. The actuator according to claim 18, wherein said driving mechanism is juxtaposed with said pump mechanism.

27. The actuator according to claim 18, wherein said pump mechanism comprises:

said pump piston which is retained by said tilting member, a cylinder body which is secured to a rotary shaft connected to a driving shaft of said pump-driving section and which retains said pump piston displaceably in said axial direction, and a spring which is interposed between said pump piston and said cylinder body; and a chamber which is formed between said pump piston and said cylinder body, wherein;

said pump piston is driven and rotated in a circumferential direction about a center of said rotary shaft by the aid of said cylinder body under a rotary action of said rotary shaft.

28. The actuator according to claim 18, wherein said tilting member is formed to have a hemispherical shape, and a through-hole, through which said rotary shaft connected to said drive shaft of said pump-driving section, is formed at a substantially central portion of said tilting member.

* * * * *